US012498280B2

(12) United States Patent
Faralli et al.

(10) Patent No.: US 12,498,280 B2
(45) Date of Patent: Dec. 16, 2025

(54) METHOD AND SYSTEM FOR INTERROGATING A BIREFRINGENT FIBER BRAGG GRATING SENSOR, EMPLOYING HETERODYNE OPTICAL DETECTION

(71) Applicant: Brembo S.p.A., Bergamo (IT)

(72) Inventors: Stefano Faralli, Bergamo (IT); Yonas Seifu Muanenda, Bergamo (IT); Fabrizio Di Pasquale, Bergamo (IT); Lorenzo Tozzetti, Bergamo (IT); Francesco Camozzi, Bergamo (IT)

(73) Assignee: Brembo S.p.A., Bergamo (IT)

( * ) Notice: Subject to any disclaimer, the term of this patent is extended or adjusted under 35 U.S.C. 154(b) by 339 days.

(21) Appl. No.: 18/258,907

(22) PCT Filed: Dec. 15, 2021

(86) PCT No.: PCT/IB2021/061767
§ 371 (c)(1),
(2) Date: Jun. 22, 2023

(87) PCT Pub. No.: WO2022/137027
PCT Pub. Date: Jun. 30, 2022

(65) Prior Publication Data
US 2024/0044731 A1 Feb. 8, 2024

(30) Foreign Application Priority Data

Dec. 23, 2020 (IT) .................. 102020000032027

(51) Int. Cl.
*G01L 1/24* (2006.01)

(52) U.S. Cl.
CPC .................... *G01L 1/246* (2013.01)

(58) Field of Classification Search
CPC . G01L 1/246; G01D 5/35383; G01D 5/35316
See application file for complete search history.

(56) References Cited

U.S. PATENT DOCUMENTS 5,319,435 A * 6/1994 Melle ..................... G01D 5/268
 250/227.18
5,469,265 A * 11/1995 Measures ........... G01D 5/35383
 250/226

(Continued)

FOREIGN PATENT DOCUMENTS

EP 1192500 B1 3/2009
JP 2001507802 A * 6/2001 ........ G01M 11/3127

(Continued)

OTHER PUBLICATIONS

European Patent Office, International Search Report and Written Opinion in Application No. PCT/IB2021/061767, dated Mar. 23, 2022, 10 pages, Rijswijk, Netherlands.

*Primary Examiner* — Octavia Hollington
(74) *Attorney, Agent, or Firm* — Marshall-Melhorn, LLC

(57) ABSTRACT

A method and system for measuring physical parameters using sensors of the birefringent Fiber Bragg Grating type is provided. In some embodiments, a method and a system for querying a sensor of the birefringent Fiber Bragg Grating (FBG) type (e.g., in birefringent fiber), employing heterodyne optical detection and integrated photonic technology is provided.

20 Claims, 7 Drawing Sheets

(56) References Cited

U.S. PATENT DOCUMENTS

| | | | | |
|---|---|---|---|---|
| 7,251,023 | B2* | 7/2007 | Bohnert | H01S 3/0675 |
| | | | | 356/73.1 |
| 7,512,291 | B2* | 3/2009 | Mendoza | G02B 6/305 |
| | | | | 385/12 |
| 9,735,886 | B2* | 8/2017 | Nazarathy | H04B 10/6151 |
| 10,809,460 | B2* | 10/2020 | Dülk | G02B 6/2786 |
| 2006/0013534 | A1 | 1/2006 | Bohnert et al. | |
| 2007/0237447 | A1* | 10/2007 | Mozdy | G01N 21/21 |
| | | | | 385/12 |
| 2020/0284621 | A1* | 9/2020 | Deliwala | G02B 6/4215 |
| 2024/0118496 | A1* | 4/2024 | Dülk | G02B 6/29398 |

FOREIGN PATENT DOCUMENTS

| | | | |
|---|---|---|---|
| WO | 9810242 | A1 | 3/1998 |
| WO | 2020070229 | A1 | 4/2020 |

\* cited by examiner

METHOD AND SYSTEM FOR INTERROGATING A BIREFRINGENT FIBER BRAGG GRATING SENSOR, EMPLOYING HETERODYNE OPTICAL DETECTION

FIELD

The invention relates, in general, to a method and system for measuring physical parameters using sensors of the birefringent Fiber Bragg Grating type.

More specifically, the present invention relates to a method and a system for querying a sensor of the birefringent Fiber Bragg Grating (FBG) type (e.g., in birefringent fiber), employing heterodyne optical detection and integrated photonic technology.

BACKGROUND

Optical fiber sensors of the Fiber Bragg Grating type (FBG sensors) are becoming more frequently used for measuring physical magnitudes, such as strain or temperature, by virtue of its features of simplicity and accuracy. Such sensors are passive, meaning that they need to be illuminated by optical radiation and the spectrum reflected or transmitted thereby must be analyzed to obtain the measurement of the desired physical magnitude.

In this context, the sensors of the birefringent Fiber Bragg Grating (Bi-FBG) have the advantage of providing more information, compared to the standard fiber FBG sensors, because they generate by reflection an optical signal which can be seen as the combination of two partially independent optical signal components, having a different optical polarization, each of which is biased in its own peculiar and predictable manner by one or more physical magnitudes detectable by the sensor.

Since it is possible to independently detect components of the spectrum reflected by the sensor having optical polarizations which are mutually orthogonal (e.g., associated with so-called "fast polarization axis" and "slow polarization axis"), it is then possible to detect the wavelength deviation of each of these components from a nominal operating wavelength of the sensor.

Therefore, a Bi-FBG sensor made of birefringent fiber makes it possible to obtain more information than a conventional fiber FBG sensor for measuring physical parameters or physical magnitudes to be detected.

On the other hand, the birefringent fiber FBG sensors require much more complex, and therefore more expensive and bulkier, interrogating/querying and processing methods and systems than standard fiber FBG sensors.

Indeed, the interrogation/querying must occur by optical excitation on at least two different channels, i.e., one channel corresponding to the fast axis polarization and one channel corresponding to the slow axis polarization (because there are at least two reflected optical signals, with different polarization, each acting around its own frequency/wavelength), which is usually carried out, in known solutions, by tunable laser sources.

Furthermore, the entire receiving, filtering, and electro-optical processing part of the optical signals reflected by the birefringent Bi-FBG sensor is at least duplicated, compared to non-birefringent FBG sensors.

The problems of complexity, cost, and bulk, which already afflict the standard fiber FBG sensor interrogation/querying systems, are felt even more critically in birefringent fiber Bi-FBG sensor interrogation/querying systems and are at least partially unsolved to date.

In light of the above, the need is strongly felt for systems and methods for interrogating birefringent fiber Bi-FBG sensors which can mitigate the above technical drawbacks, and meet the following criteria: (i) compactness and simplicity in structure and use; (ii) effectiveness in performance.

Such needs are felt especially in many technical fields in which birefringent fiber Bi-FBG sensors, from the point of view of detection capabilities, potentially offer significant advantages, which in practice can be frustrated by the fact that it is difficult, if not impossible, to install the birefringent fiber Bi-FBG sensor interrogation systems (which are, of course, essential for practical applicability) made available in the prior art, due to complexity and bulk.

SUMMARY

It is the object of the present invention to provide a method for interrogating a sensor of the birefringent Fiber Bragg Grating type which can at least in part solve the drawbacks described above with reference to the prior art and respond to the aforesaid needs particularly felt in the considered technical sector.

This and other objects are achieved by a method for interrogating the at least one sensor of the birefringent Fiber Bragg Grating type.

Some advantageous embodiments of such method are the subject of the dependent claims.

It is a further object of the present invention to provide a corresponding system for interrogating at least one sensor of the birefringent Fiber Bragg Grating (Bi-FBG) type.

This object is achieved by a process according to the claims.

Some advantageous embodiments of such a system are the subject of the dependent claims.

It is another object of the present invention to provide a method for at least two physical magnitudes detectable by a sensor of the birefringent Fiber Bragg Grating (Bi-FBG) type employing the aforementioned interrogation method.

Such an object is achieved by a method according to the claims.

Some advantageous embodiments of such a method are the subject of the dependent claims.

It is a further object of the present invention to provide a corresponding system for determining at least two physical magnitudes detectable by a sensor of the birefringent Fiber Bragg Grating (Bi-FBG) type.

This object is achieved by a system according to the claims.

Some advantageous embodiments of such a system are the subject of the dependent claims.

DESCRIPTION OF THE FIGURES

Further features and advantages of the method and system according to the invention will be apparent from the description below of preferred embodiments thereof, provided by way of non-limiting explanation, with reference to the accompanying drawings, in which.

DETAILED DESCRIPTION OF THE INVENTION

Figure 1:
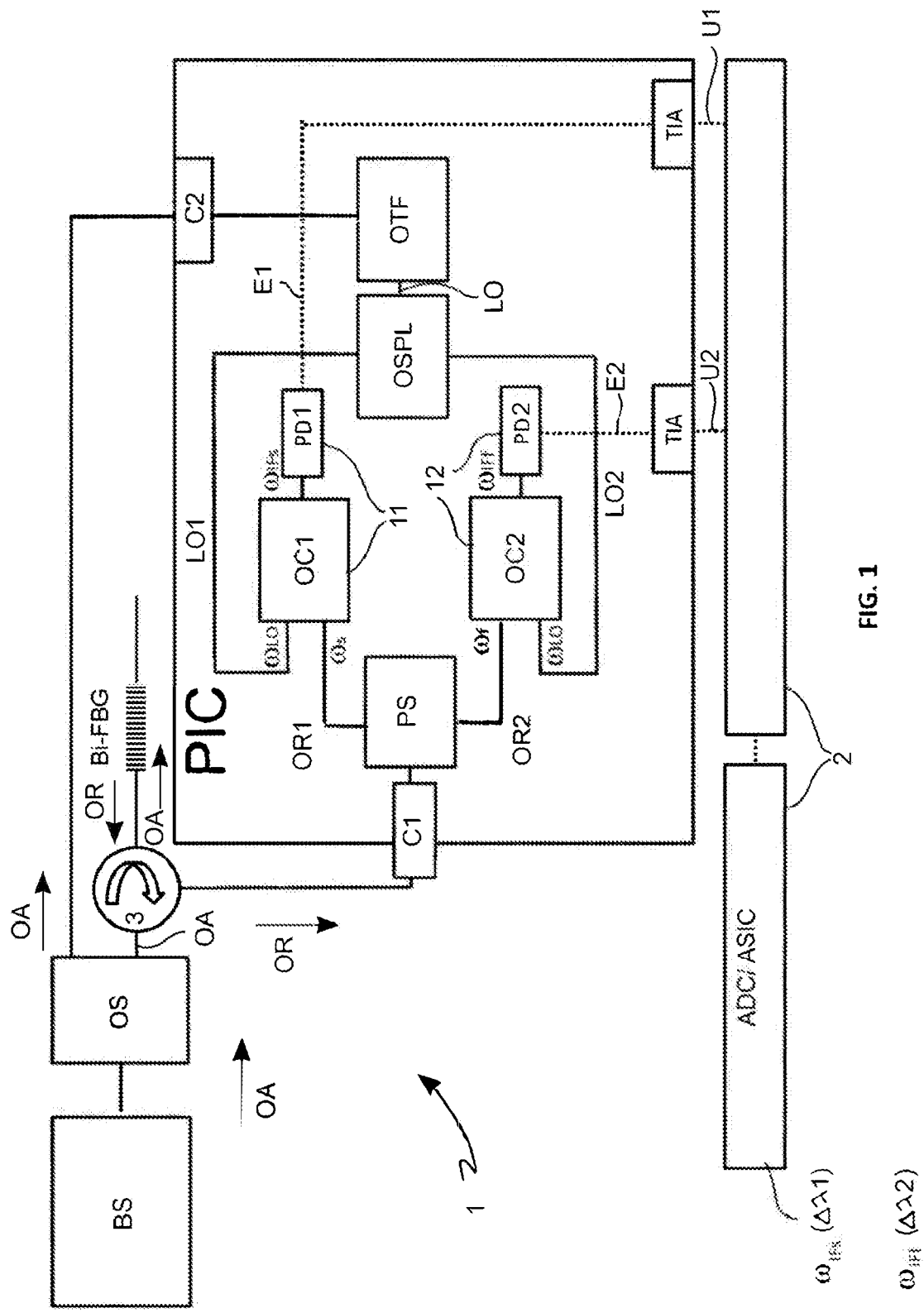
FIG. 1 illustrates an embodiment of a system for interrogating a sensor of the birefringent Fiber Bragg Grating (Bi-FBG) type by means of a functional block chart.

With reference to FIGS. 1-6, it is now described a method for interrogating at least one sensor of the birefringent Fiber Bragg Grating (FBG) type (hereafter also sometimes named birefringent Bi-FBG sensor for the sake of brevity), e.g., a Bi-FBG type sensor obtained in a birefringent fiber or in an optical fiber zone made birefringent.

Such a method firstly comprises the steps of illuminating the aforesaid at least one sensor of the birefringent Fiber Bragg Grating Bi-FBG type with a broadband optical excitation radiation OA, and conveying the reflected optical spectrum OR, reflected by the at least one sensor of the birefringent Fiber Bragg Grating Bi-FBG type in an integrated photonic PIC detection circuit (or device).

The method then includes separating a first component of the aforesaid reflected optical spectrum OR1, characterized by a first optical polarization generated by the birefringence and centered around a first frequency $\omega 1$, from a second component of the aforesaid reflected optical spectrum OR2, characterized by a second optical polarization generated by the birefringence and centered around a second frequency $\omega 2$, by means of a polarization optical beam splitter comprised in the detection photonic integrated circuit PIC.

The method further comprises providing the aforesaid broadband optical excitation OA to the detection photonic integrated circuit PIC, and obtaining at least two narrowband optical signals (LO1, LO2), on the basis of at least one narrowband optical filtering of the aforesaid broadband optical excitation radiation OA carried out in the detection photonic integrated circuit PIC.

The aforesaid at least two narrowband optical signals (LO1, LO2) comprise a first local oscillator optical signal LO1, centered around a first local oscillator frequency $\omega_{LO1}$, and a second local oscillator optical signal LO2, centered around a second local oscillator frequency $\omega_{LO2}$.

The method then includes providing the aforesaid first component of the reflected optical spectrum OR1 and the aforesaid first local oscillator optical signal LO1 to first optical heterodyne detection means, integrated in the detection photonic integrated circuit PIC, to carry out a heterodyne detection and obtain a first electrical signal E1 at a first intermediate frequency $\omega_{IFs}$, equal to the difference between the first local oscillator frequency $\omega_{LO1}$, and said first frequency $\omega 1$ of the first component of the reflected optical spectrum OR1.

Similarly, the method further includes providing the aforesaid second component of the reflected optical spectrum OR2 and the aforesaid second local oscillator optical signal LO2 to second optical heterodyne detection means, also integrated into said detection photonic integrated circuit PIC, to carry out a heterodyne detection and obtain a second electrical signal E2 at a second intermediate frequency $w_{IFf}$, equal to the difference between the second local oscillator frequency $\omega_{LO2}$ and the aforesaid second frequency $\omega 2$ of the second component of the reflected optical spectrum OR2.

The method finally comprises the step of determining the first intermediate frequency $\omega_{IFs}$, indicative of a first wavelength shift $\Delta\lambda 1$ of the first component of the reflected optical spectrum OR1, having the first polarization, with respect to a first reference wavelength $\lambda_{ref1}$; and, furthermore, the step of determining the aforesaid second intermediate frequency $\omega_{IFf}$ indicative of a second wavelength shift $\Delta\lambda 2$ of the second component of the reflected optical spectrum OR2, having the second polarization, with respect to a second reference wavelength $\lambda_{ref2}$.

The aforesaid first wavelength shift $\Delta\lambda 1$ and second wavelength shift $\Delta\lambda 2$ (of which the determined intermediate frequencies are indicative) are representative of at least one physical magnitude measured by the optical fiber sensor Bi-FBG.

According to an embodiment of the method, shown in FIG. 1, the aforesaid step of obtaining at least two narrowband optical signals (LO1, LO2) comprises the steps of:

narrowband filtering the aforesaid broadband optical excitation radiation OA, by means of a narrowband bandpass optical tunable filter OTF integrated into the detection photonic integrated circuit PIC, to obtain a narrowband optical signal centered around a local oscillator frequency $\omega_{LO}$ adapted to act as a local oscillator signal LO;

splitting the aforesaid narrowband optical signal by means of an optical beam splitter OSPL, configured to make two attenuated replicas of the same narrowband optical signal, received as input, available to two output ports.

In such a case, the first local oscillator signal LO1 and the second local oscillator signal LO2 are the two signals, identical to each other, present at the two output ports of the optical beam splitter.

Figure 2:
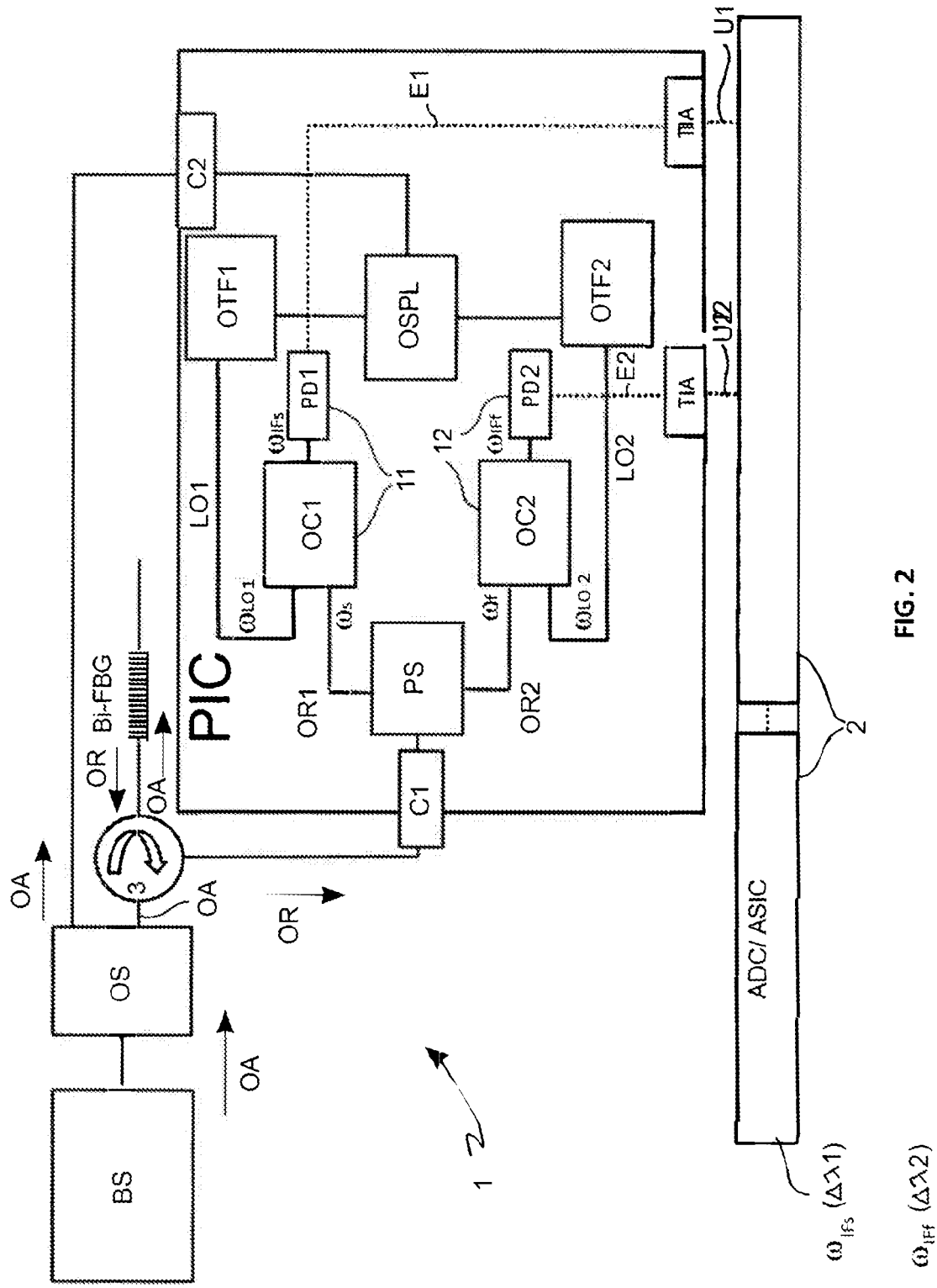
FIG. 2 illustrates a different embodiment of a system for interrogating a sensor of the birefringent Fiber Bragg Grating (Bi-FBG) type by means of a functional block chart.

According to another embodiment of the method, shown in FIG. 2, the aforesaid step of obtaining at least two narrowband optical signals (LO1, LO2) comprises the steps of:

splitting the aforesaid broadband optical excitation radiation OA by means of an optical beam splitter to obtain a first replica of the broadband optical excitation radiation and a second replica of the broadband optical excitation radiation;

narrowband filtering the aforesaid first replica of the broadband optical excitation radiation, by means of a first narrowband band-pass optical tunable filter OTF1 integrated in the detection photonic integrated circuit PIC to obtain the first narrowband optical signal centered around the first local oscillator frequency $\omega_{LO1}$;

narrowband filtering the aforesaid second replica of the broadband optical excitation radiation, by means of a second narrowband band-pass optical tunable filter OTF2 integrated in the detection photonic integrated circuit PIC to obtain the second narrowband optical signal centered around the second local oscillator frequency $\omega_{LO2}$.

According to an embodiment of the method, e.g. illustrated in FIGS. 1-4, the step of carrying out a heterodyne detection and obtaining a first electrical signal E1 comprises combining the first component of the reflected optical spectrum OR1 and the first local oscillator optical signal LO1 in an optical waveguide of a first optical coupler OC1 of the first optical heterodyne detection means, and further comprises converting the optical signal obtained at the output of the first optical coupler into a respective first electrical signal E1, by means of a first opto-electronic receiver PD1 of the first optical heterodyne detection means.

In such an embodiment, the step of carrying out a heterodyne detection and obtaining a second electrical signal E2 comprises combining the second component of the reflected optical spectrum OR2 and the second local oscillator optical signal LO2 in an optical waveguide of a second optical coupler OC2 of the second optical heterodyne detection means, and further comprises converting the optical signal obtained at the output of the second optical coupler into a respective second electrical signal E2, by means of a second opto-electronic receiver PD2 of the second optical heterodyne detection means.

According to an implementation option (shown in FIG. 3), each of the steps of carrying out a heterodyne detection to obtain a first electrical signal E1 and a second electrical signal E2 comprises carrying out a balanced detection, using a respective 2×2 optical coupler, configured to provide as output two optical signals, for each heterodyne detection, which are detected by two respective photodiodes for balanced detection, for each heterodyne detection, wherein each of the first electrical signal E1 and the second electrical signal E2 is obtained as a subtraction of the currents output from the respective photodiodes.

According to another implementation option of the method (shown in FIG. 4), the step of carrying out the first heterodyne detection further comprises shifting, in a controlled manner, the phase of the first local oscillator optical signal LO1 by means of a first optical phase shifter OPS1, comprised in the photonic integrated circuit PIC, before the input in the first optical coupler OC1.

Similarly, the step of carrying out the second heterodyne detection further comprises shifting, in a controlled manner, the phase of the second local oscillator optical signal LO2 by means of a second optical phase shifter OPS2, comprised in the photonic integrated circuit PIC, before the input in the second optical coupler OC2.

According to another implementation option of the method (shown in FIG. 5), the step of carrying out a heterodyne detection comprises injecting the first component of the reflected optical spectrum OR1 and the second component of the reflected optical spectrum OR2 into a single 2×1 optical coupler OC, configured to generate as output an optical signal at an intermediate frequency $\omega_{IF}$ representative of the difference between the frequency deviations of the first component of the reflected optical spectrum OR1 and the second component of the reflected optical spectrum OR2.

The heterodyne detection, which can also be referred to as coherent optical detection (or reception) using a heterodyne technique, is a general known technique. In the following description of the corresponding system according to the invention, further details will be provided in this regard, with reference to the embodiments shown in FIGS. 1-6.

Figure 6:
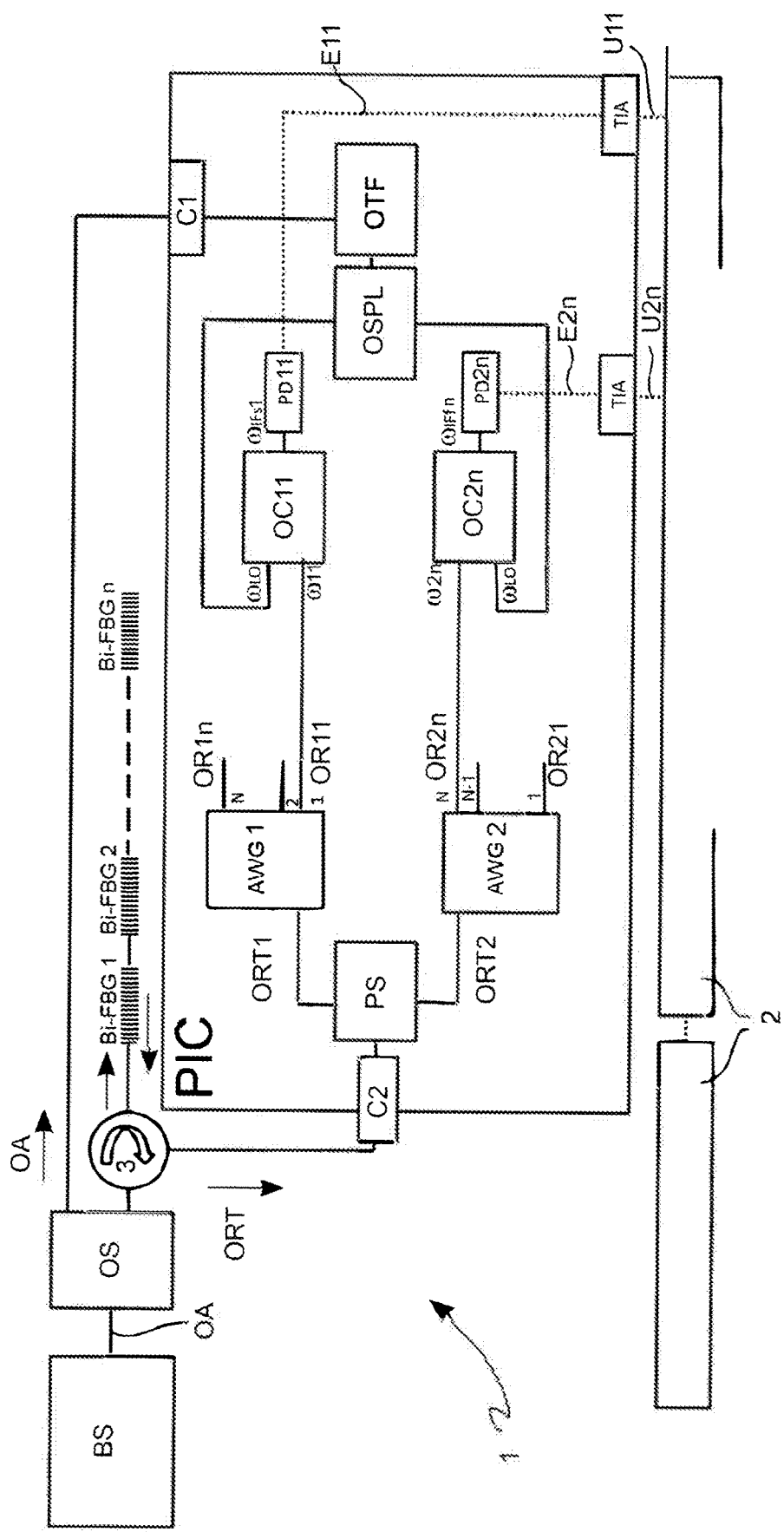
FIG. 6 illustrates a different embodiment of a system for interrogating a sensor of the birefringent Fiber Bragg Grating (Bi-FBG) type by means of a functional block chart.

According to an embodiment, shown in FIG. 6, the method is capable of interrogating a plurality of sensors of the birefringent Fiber Bragg Grating type (Bi-FBG1-Bi-FBGn) in cascade, each characterized by a respective nominal operating wavelength (λ1-λn).

In such an embodiment, the step of conveying comprises conveying the overall reflected optical spectrum ORT, reflected from the cascade of sensors of the birefringent Fiber Bragg Grating type (Bi-FBG1-Bi-FBGn), into a detection photonic integrated circuit PIC; and the step of separating comprises separating a first component ORT1 and a second component of the aforesaid overall reflected optical spectrum ORT1.

The first component of the overall reflected optical spectrum ORT1 comprises the superposition of the first components (OR11-OR1n) with first optical polarization, each centered around a respective first frequency ($\omega11$-$\omega1n$).

The second component of the overall reflected optical spectrum ORT2 comprises the superposition of the second components (OR21-OR2n) with second optical polarization, each centered around a respective second frequency ($\omega21$-$\omega2n$).

In this case, the method comprises the further steps of:
spectrally separating the first components (OR11-OR1n) from one another by means of first frequency discrimination or demultiplexing means AWG1;
spectrally separating the second components (OR21-OR2n) from one another by means of second frequency discrimination or demultiplexing means AWG2;
carrying out the aforesaid heterodyne detection steps on each of the first components (OR11-OR1n) and on each of the second components (OR21-OR2n), to obtain a respective plurality of first electrical signals E1$k$ and second electrical signals E2$k$;
carrying out the aforesaid steps of determining the first intermediate frequency $\omega_{IFs,k}$ and the second intermediate frequency $\omega_{IFf,k}$ for each pair of first electrical signal E1$k$ and second electrical signal E2$k$ corresponding to a respective sensor of the birefringent Fiber Bragg Grating type Bi-FBG$k$.

According to an embodiment of the method, the aforesaid first optical polarization corresponds to the polarization on a "slow polarization axis" ("slow axis" for the sake of brevity) and the first birefringence peak frequency $\omega1$ corresponds to the slow axis birefringence peak frequency $\omega$s; the aforesaid second optical polarization is orthogonal to the first optical polarization and corresponds to the polarization on a "fast polarization axis" ("fast axis" for the sake of brevity), orthogonal to the aforesaid "slow polarization axis", and the second birefringence peak frequency $\omega2$ corresponds to the fast axis birefringence peak frequency $\omega$f.

According to an embodiment of the method, the aforesaid first reference wavelength $\lambda_{ref1}$ and the aforesaid second reference wavelength $\lambda_{ref2}$ correspond to two respective nominal operating wavelengths of the sensor of the birefringent Fiber Bragg Grating type Bi-FBG, on the two fast and slow channels, determined by means of an initial calibration.

According to another embodiment of the method, the aforesaid first reference wavelength $\lambda_{ref1}$ and second reference wavelength $\lambda_{ref2}$ coincide and correspond to a reference wavelength λi identified by the tuning of the narrowband band-pass optical tunable filter OTF.

According to an implementation option of the method, the aforesaid first reference wavelength $\lambda_{ref1}$ and second reference wavelength $\lambda_{ref2}$ respectively correspond to two reference wavelengths λi1 and λi2 identified by the tuning of the two narrowband band-pass optical tunable filters (OTF1, OTF2).

According to another implementation option, the aforesaid first reference wavelength $\lambda_{ref1}$ and the aforesaid second reference wavelength $\lambda_{ref2}$ coincide and correspond to two respective nominal operating wavelengths of the sensor of the birefringent Fiber Bragg Grating Bi-FBG type, on the two fast and slow channels.

A method for determining at least two physical magnitudes detectable by a sensor of the birefringent Fiber Bragg Grating type Bi-FBG is now described.

Such a method provides performing a method for interrogating at least one sensor of the birefringent Fiber Bragg Grating Bi-FBG type according to any one of the embodiments described above and then determining at least two physical magnitudes on the basis of processing of the aforesaid first intermediate frequency $\omega_{IFs}$ and second intermediate frequency $\omega_{IFf}$.

According to an implementation option of such a method, the two determined physical magnitudes are longitudinal strain and transverse strain.

According to another implementation option of such a method, the two determined physical magnitudes are strain and temperature.

In this regard, further explanations are provided below, referring to the aforesaid embodiments concerning a method for measuring two orthogonally polarized Bragg wavelengths reflected by Fiber Bragg Grating Bi-FBG sensors characterized by birefringence.

A periodic and uniform change in the refractive index of the optical fiber "core" is the simplest form of the Bi-FBG structure. The fundamental characteristic of the Bi-FBG sensor is the presence of a resonant condition, which reflects light at a particular wavelength, named Bragg wavelength ($\lambda_B$), defined by the following relationship:

$$\lambda_B = 2n_{eff} \wedge$$

where n eff is the effective refractive index of the fiber and $\wedge$ is the grating period, also called pitch of the grating. The Bragg wavelength depends on the grating pitch ($\wedge$) and the effective refractive index of the fiber core ($n_{eff}$), and these parameters are sensitive to changes in temperature and strain. Because of this, Bi-FBG sensors can be directly exploited as strain and temperature sensors.

If the fiber is birefringent, the effective refractive indices experienced by light propagating in two orthogonal polarizations are different and are typically defined denoted as $n_{eff-s}$ and $n_{eff-f}$.

Thus, two orthogonally polarized spectra, reflected by the Bi-FBG sensor in birefringent fiber, are observed with two different wavelengths, having a peak wavelength separation of $\Delta\lambda = \lambda_s - \lambda_f = 2(n_{eff-s} - n_{eff-f})/\wedge$.

Similar considerations can be made by referring, instead of the wavelength, to the corresponding frequency parameter $\omega$.

Examples of birefringent fibers used in the manufacturing of birefringent Bi-FBG sensors include Panda and True-Phase fibers, bow-tie fibers, fibers with D cladding, and elliptical core, elliptical cladding fibers, and micro-structured high-birefringence optical fibers (MOFs).

Birefringent Bragg gratings can also be induced in an optical fiber by femtosecond writing; in such a case, the birefringence is inscribed only in the limited area of fiber where the Bi-FBG sensor is obtained.

The birefringent Bi-FBG sensor advantageously allows simultaneous strain and temperature detection by measuring Bragg wavelength offsets corresponding to the optical polarization fast and slow axes.

Assuming a linear dependence, the correlation between the Bragg wavelengths $\lambda_s$ and $\lambda^f$ and the temperature and strain variations can be expressed through the following equations expressed in matrix form:

$$\begin{pmatrix} \Delta\lambda_s \\ \Delta\lambda_f \end{pmatrix} = \begin{pmatrix} K_T^s & K_\varepsilon^s \\ K_T^f & K_\varepsilon^f \end{pmatrix} \begin{pmatrix} \Delta T \\ \Delta\varepsilon \end{pmatrix}$$

where $\Delta\lambda_s$ and $\Delta\lambda_f$ are the Bragg wavelength variations of the slow axis and the fast axis, $K_T^s$ and $K_T^f$ are the temperature sensitivities for the slow axis and the fast axis, $K_\varepsilon^s$ and $K_\varepsilon^f$ are the strain sensitivities, $\Delta T$ is the temperature variation, and $\Delta\varepsilon$ is the strain variation.

Therefore, the temperature change $\Delta T$ and the strain change at $\Delta\varepsilon$ can be simultaneously calculated through the inverse matrix:

$$\begin{pmatrix} \Delta T \\ \Delta\varepsilon \end{pmatrix} = \frac{1}{D} \begin{pmatrix} K_\varepsilon^f & -K_\varepsilon^s \\ -K_T^f & K_T^s \end{pmatrix} \begin{pmatrix} \Delta\lambda_s \\ \Delta\lambda_f \end{pmatrix}$$

where $D = K_T^s K_\varepsilon^f K_T^f K_\varepsilon^s$ is the determinant of the matrix.

The birefringent Bi-FBG sensor also allows for the distinction between transverse and longitudinal strain.

Indeed, the Bi-FBG sensor experiences maximum transverse strain dependence if the birefringence axes are positioned to be orthogonal and parallel to the surface. When a transverse load is applied along with one of the two birefringence axes, the corresponding reflected peak exhibits the maximum transverse strain sensitivity.

Instead, if the axes are positioned at 45° with respect to the surface, the sensitivity of the Bi-FBG sensor to transverse strain is reduced and the wavelength deviation depends primarily on the longitudinal strain.

This property of birefringent Bi-FBG sensors allows the distinction between the two types of strain and, advantageously, enables a shear strain measurement; for example, the article by S. Sulejmani, et al, "*Shear stress sensing with Bragg grating-based sensors in microstructured optical fibers*," Opt. Express 21, 20404-20416 (2013) shows that a maximum shear strain sensitivity of wavelength separation deviation is obtained when the birefringence axes are positioned at 45°.

Therefore, it is apparent the advantage of the Bi-FBG birefringent sensor, which allows, by virtue of the information provided by the two spectral components of different polarization, to detect two different magnitudes simultaneously.

With reference to FIGS. 1-6, it is now described a system 1 for interrogating at least one sensor of the birefringent Fiber Bragg Grating FBG type (hereafter also sometimes named birefringent Bi-FBG sensor for the sake of brevity), e.g., a Bi-FBG type sensor obtained in a birefringent fiber, or in an optical fiber zone made birefringent.

Such a system comprises a broadband optical radiation source BS, an integrated photonic detection device PIC, and electronic processing means 2 operatively connected with said integrated photonic device PIC.

The broadband optical radiation source BS is configured to illuminate the aforesaid at least one sensor of the birefringent Fiber Bragg Grating Bi-FBG type with a broadband optical excitation radiation OA.

The integrated photonic detection device PIC comprises a first input port C1, operatively connectable to the aforesaid at least one optical fiber sensor of the birefringent Fiber Bragg Grating Bi-FBG type to receive the reflected optical spectrum OR from the sensor, and a second input port C2, operatively connected to said broadband optical radiation source BS to receive the aforesaid broadband optical excitation radiation OA.

The integrated photonic detection device PIC comprises a polarization optical beam splitter PS, local oscillator signal generation means, first heterodyne optical detection means, second heterodyne optical detection means, a first output port U1, and a second output port U2.

The polarization optical beam splitter PS is configured to separate a first component of the aforesaid reflected optical spectrum OR1, characterized by a first optical polarization generated by the birefringence and centered around a first frequency ω1, from a second component of the aforesaid reflected optical spectrum OR2 by a second optical polarization generated by the birefringence and centered around a second frequency ω2.

The local oscillator signal generation means are configured to obtain at least two narrowband optical signals (LO1, LO2) comprising a first local oscillator optical signal LO1, centered around a first local oscillator frequency $\omega_{LO1}$, and a second local oscillator optical signal LO2, centered around a second local oscillator frequency $\omega_{LO2}$.

Such local oscillator signal generation means comprise at least one tunable narrowband optical bandpass filter OTF, configured to perform narrowband optical filtering of said broadband optical excitation radiation OA.

The first optical heterodyne detection means are configured to receive the aforesaid first component of the reflected optical spectrum OR1 and the aforesaid first local oscillator optical signal LO1 and generate, by means of heterodyne detection or reception techniques, on the basis of the first component of the reflected optical spectrum OR1 and of the first local oscillator optical signal LO1, a first electrical signal E1 at a first intermediate frequency $\omega_{IFs}$ equal to the difference between the first local oscillator frequency $\omega_{LO1}$ and the aforesaid first frequency ω1 of the first component of the reflected optical spectrum OR1.

The second optical heterodyne detection means are configured to receive the aforesaid second component of the reflected optical spectrum OR2 and the aforesaid second local oscillator optical signal LO2 and generate, by means of heterodyne detection techniques, on the basis of the second component of the reflected optical spectrum OR2 and of the second local oscillator optical signal LO2, a second electrical signal E2 at a second intermediate frequency $\omega_{IFf}$ equal to the difference between the second local oscillator frequency $\omega_{LO2}$ and the aforesaid second frequency ω2 of the second component of the reflected optical spectrum OR2.

The first output port U1, configured to make the first electrical signal E1 available, and a second output port U2, configured to make the second electrical signal E2 available.

The electronic processing means are operatively connected with the integrated PIC photonic device to receive the aforesaid first electrical signal E1 and second electrical signal E2 and are configured to determine the aforesaid first intermediate frequency $\omega_{IFs}$, indicative of a first wavelength offset Δλ1 of the first component of the reflected optical spectrum OR1, having the first polarization, with respect to a first reference wavelength $\lambda_{ref1}$.

The electronic processing means are further configured to determine the aforesaid second intermediate frequency $\omega_{IF2}$, indicative of a second wavelength shift Δλ2 of the second component of the reflected optical spectrum OR2, having the second polarization, with respect to a second reference wavelength $\lambda_{ref2}$.

The aforesaid first wavelength shift Δλ1 and second wavelength shift Δλ2 are representative of at least one physical magnitude measured by the optical fiber sensor Bi-FBG.

According to an embodiment of the system 1 (shown in FIG. 1), the aforesaid means of generating local oscillator signals comprise a tunable narrowband OTF optical filter and an optical beam splitter.

The narrowband optical tunable OTF is configured to narrowband filter the aforesaid broadband optical excitation radiation OA, and to generate a narrowband optical signal centered around a local oscillator frequency $\omega_{LO}$ adapted to act as a local oscillator signal LO.

The optical beam splitter is configured to split the aforesaid narrowband optical signal and to make two attenuated replicas of the narrowband optical signal itself received as input corresponding, respectively, to the first local oscillator signal LO1 and the second local oscillator signal LO2 available to two output ports of the optical beam splitter.

Some additional details of the aforesaid embodiment will be discussed below with reference to FIG. 1.

As can be seen, the system comprises a device for coupling and a device for splitting (or divide) the two orthogonal polarizations, corresponding to the fast axis and the slow axis, into two optical waveguides.

The device for splitting (or dividing) the two orthogonal polarizations, in several possible implementation options, is for example a two-dimensional 2D grating coupler or an edge coupler combined with a polarization rotator and splitter (PSR).

The system further comprises two different integrated photonic circuits which implement heterodyne detection schemes.

The two orthogonal polarizations at different frequencies/wavelengths, reflected by the birefringent Bi-FBG, are separated and coupled to two single-mode waveguides, in which the two signals at different frequencies/wavelengths are analyzed separately.

The two signals are separately combined, by means of two integrated optical couplers, with a local oscillator signal, and then mixed in integrated photodiodes to detect the frequency deviation of the two individual peaks, through heterodyne detection.

As shown in the example shown in FIG. 1, the light coming from a broadband source BS is divided by an optical splitter ("splitter") OS and sent to both the first port of an optical circulator 3 and an input port of the photonic integrated circuit PIC.

The birefringent Bi-FBG sensor is interrogated by the broadband source BS through the second port of the optical circulator, and the reflected optical power from the birefringent Bi-FBG sensor is collected by the third port of the optical circulator and coupled to the chip implementing the PIC integrated photonic circuit.

The integrated PIC photonic circuit comprises an optical coupler C1 and a signal polarization splitter PS (wherein the polarization splitter, or polarization optical beam splitter may comprise, as noted above, a 2D grating coupler or a PSR), with respect to the fast and slow axis polarizations reflected by the birefringent Bi-FBG sensor.

The integrated photonic circuit PIC further comprises an additional optical coupler C2 (e.g., a one-dimensional grating coupler or an "edge" coupler) configured to couple broadband light to the integrated photonic circuit.

The photonic integrated circuit PIC further comprises:
- at least one tunable optical bandpass OTF filter (for example, but not limited to, a ring resonator filter) to select a desired frequency/wavelength, which is used as a local oscillator signal;
- at least two integrated optical couplers configured to combine the optical signal and the local oscillator signal in the same waveguide;
- at least two integrated photodiodes for heterodyne detection.

The coupler couples the light reflected from the third port of the optical circulator to the PIC optical chip, and the PS polarization splitter separates the light by sending it into two different optical waveguides; the two orthogonal polarizations reflected from the birefringent Bi-FBG sensor at the frequencies of the fast axis ωs and the slow axis ωf are coupled and sent into two different waveguides of the PIC integrated photonic circuit.

According to an implementation option, the scheme further comprises a polarization rotator or a 2D grating coupler to couple the light separated by the splitter into two waveguides TE.

The broadband light coupled and supplied as input to another input port on the PIC chip is filtered by a tunable optical band-pass filter OTF to select a specific wavelength.

According to an implementation option, the tunable filter is based on an extraction (drop) port of a tunable micro-ring resonator.

The filtered light at a selected wavelength operates as a local LO oscillator, and is split and sent to two different integrated optical couplers OC1, OC2 and combined with light at the frequencies of the slow polarization axis ωs and the fast polarization axis ωf.

Each coupler combines the frequency of the local LO oscillator and a respective one of the two frequencies ωs and ωf, and the output signal of the optical coupler is sent to an integrated photodiode according to a heterodyne configuration.

The two optical signals and the local oscillator propagate in the waveguide with the same cross-section and polarization, providing the maximum polarization match for heterodyne detection.

The terms resulting from the mixing of the two heterodyne detections at the two intermediate frequencies $\omega_{IFs}=\omega s-\omega_{LO}$ and on the other side $\omega_{IFf}=\omega f-\omega_{LO}$ carry the information about the wavelengths of the reflection peaks of the birefringent Bi-FBG sensor and can be used to detect the wavelength offset of the birefringent Bi-FBG sensor and the wavelength separation between the two peaks corresponding to the slow axis and the fast axis, respectively.

According to another embodiment of the system (shown in FIG. 2), the aforesaid generating means of local oscillator signals comprise an optical beam splitter OSPL, a first tunable narrow-band-pass optical filter OTF1, and a second tunable narrow-band-pass optical filter OTF2.

The optical beam splitter OSPL is configured to split the aforesaid broadband optical excitation radiation OA, to obtain a first replica of the broadband optical excitation radiation and a second replica of the broadband optical excitation radiation.

The first narrowband optical tunable OTF1 is configured to narrowband filter the aforesaid first replica of the broadband optical excitation radiation, and to generate the first narrowband optical signal LO1 centered around the first local oscillator frequency $\omega_{LO1}$.

The second narrowband optical tunable OTF2 is configured to narrowband filter the aforesaid second replica of the broadband optical excitation radiation, and to generate the second narrowband optical signal LO2 centered around the second local oscillator frequency $\omega_{LO2}$.

Some additional details of the aforesaid embodiment will be discussed below with reference to FIG. 2.

In this case, the PIC device comprises two different tunable narrowband optical filters, OTF1, OTF2, configured to select two independent local oscillators at two different frequencies $\omega_{LO1}$ and $\omega_{LO2}$.

The two intermediate frequencies for detecting the two peaks in wavelength, $\omega_{IFs}=\omega s-\omega_{LO}$ and $\omega_{IFf}=\omega f-\omega_{LO}$, are independent. According to an of implementation option, such frequencies are finely tuned to facilitate and make the subsequent detection phase more accurate.

Advantageously, this embodiment, which uses two independent local oscillators, offers greater flexibility in the heterodyne detection scheme, because it allows for independent control of intermediate frequencies, i.e., the beat frequencies between the local oscillator and the "slow" and "fast" polarized optical signals. Such flexibility, in turn, leads to additional advantages, for example, it makes it possible to reduce the bands required to the photodiodes, thus reducing the noise at their input and thus improving the signal-to-noise ratio SNR of the measurement.

According to an embodiment of the system 1 (illustrated for example in FIGS. 1-3), the first heterodyne detection means include first optical coupler OC1 comprising a respective optical waveguide, configured to combine the first component of the reflected optical spectrum OR1 and the first local oscillator optical signal LO1, and include a first opto-electronic receiver PD1 configured to receive the output optical signal from the first optical coupler OC1 and convert it into a respective first electrical signal E1.

The second heterodyne detection means include a second optical coupler OC2 comprising a respective optical waveguide, configured to combine the second component of the reflected optical spectrum OR2 and the second local oscillator optical signal LO2; and include a second opto-electronic receiver PD2 configured to receive the output optical signal from the second optical coupler OC2 and convert it into a respective second electrical signal E2.

According to various possible implementation options, the first and second means of heterodyne detection or reception are implemented by means of heterodyne detection or reception devices known in themselves.

Reference may be made, for example, to Rongqing Hui "*Introduction to Fiber-Optic Communications*"—1st Edition, Jun. 13, 2019 (DOI: 10.1016/B978-0-12-805345-4.00009-3), from which the illustrations in FIGS. 7 and 8 were excerpted and will be briefly discussed below.

Figure 7:
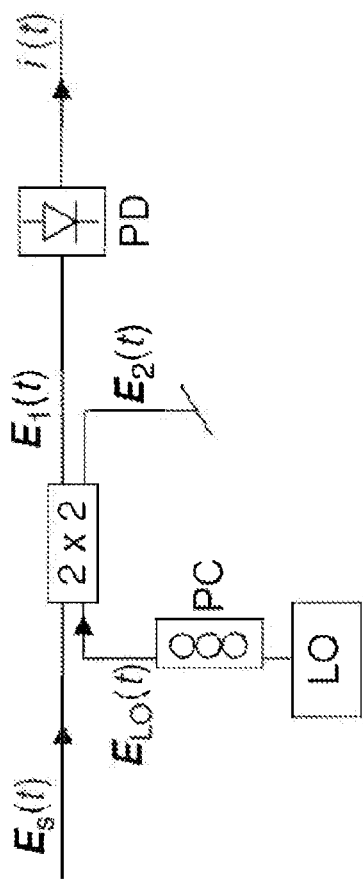
FIG. 7 illustrates, in a simplified manner, some known optical heterodyne detection/reception techniques [.]

FIG. 7 shows a well-known example of a heterodyne mixing technique, which allows to lower the frequency of an optical frequency signal obtaining a corresponding intermediate frequency signal which can be easily detected by electronic reception.

In particular, a mixing between an optical signal and a local oscillator can be achieved by means of a photodiode, i.e., a detector with a quadratic detection law in which two electromagnetic fields, corresponding respectively to the incoming signal $E_s(t)$ and the local oscillator $E_{LO}(t)$ are mixed providing a photocurrent i(t) which is proportional to the square of the two input electromagnetic fields.

The incoming optical signal $E_s(t)$ and the local oscillator optical signal $E_{LO}(t)$ can be expressed as:

$$\vec{E}s(t)=\vec{A}s(t)\exp(j\omega_s t+j\varphi_s t)$$

$$\vec{E}lo(t)=\vec{A}lo(t)\exp(j\omega_{LO}t+j\varphi_{LO}t)$$

where $A_s(t)$ and $A_{LO}(t)$ are the amplitudes, $\omega_s$ and $\omega_{LO}$ are the angular frequencies or pulsations, and $\varphi_s$ and $\varphi_{LO}$ are the phases of the incoming signal and the local oscillator, respectively.

Apart from the direct detection components of the optical signal and the local oscillator, and considering that the optical power of the local oscillator is typically (and anyway can be made) much greater than the power of the incoming optical signal, the most significant photocurrent component i(t) is observed at the intermediate frequency $w_{IF}=\omega_s-\omega_{LO}$ and can be written as:

$$i(t) \approx \mathcal{R}\sqrt{\mathrm{E}(1-\mathrm{E})}\sqrt{P_sP_{LO}}\cos\theta\cos(\omega_{IF}t+\Delta\varphi)$$

where $\mathcal{R}$ is the responsiveness of the photodiode, E is the power coupling coefficient of the optical coupler (shown in FIG. 7), θ is the polarization state difference angle between the optical signal and the local oscillator, Δφ is the relative phase difference.

Figure 3:
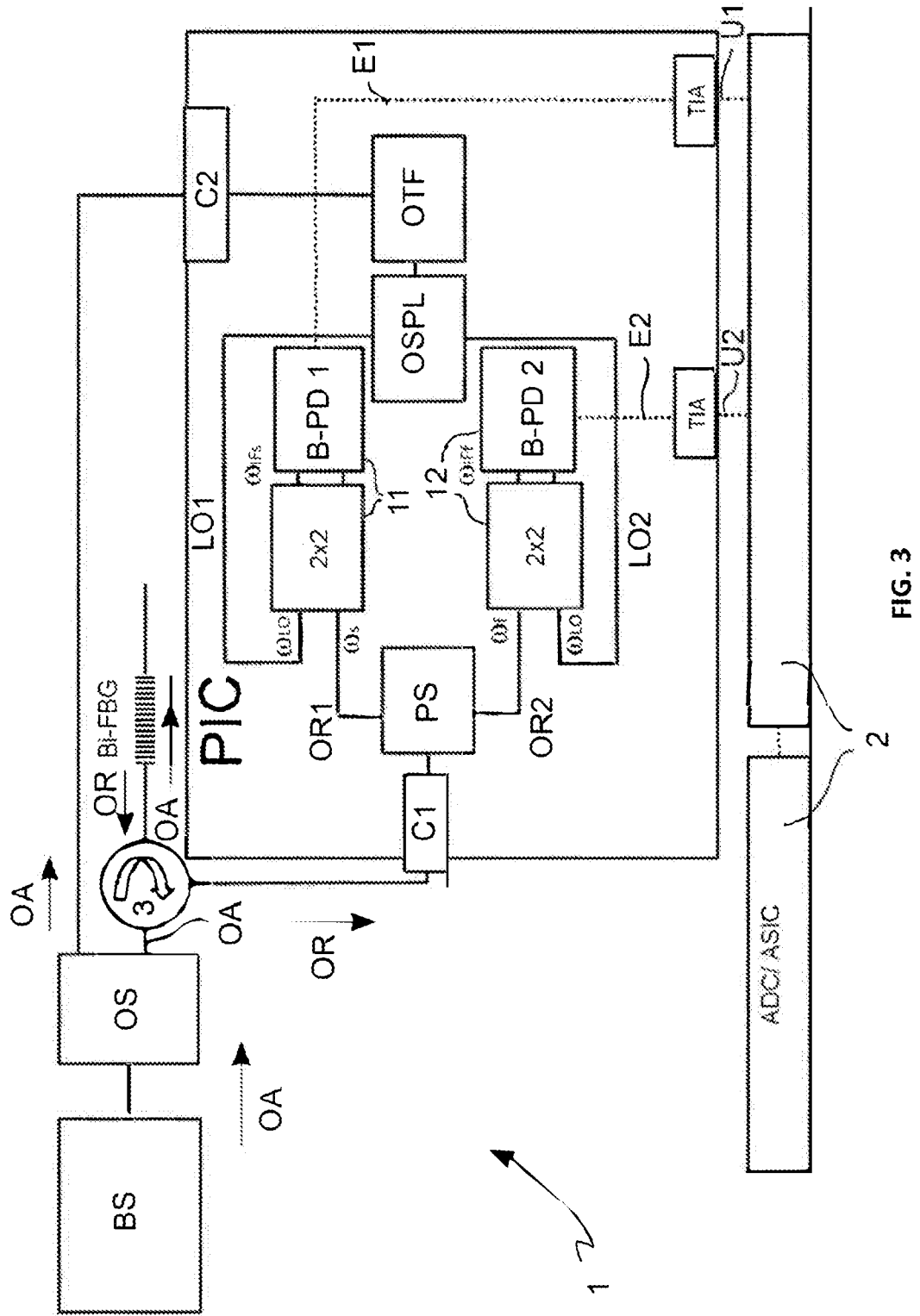
FIG. 3 illustrates a different embodiment of a system for interrogating a sensor of the birefringent Fiber Bragg Grating (Bi-FBG) type by means of a functional block chart.

According to another embodiment of the system, shown in FIG. 3, the aforementioned first optical coupler OC1 is a 2×2 optical coupler, configured to output two optical beat signals, resulting from the combination of the first reflected optical spectrum component OR1 and the first local oscillator optical signal LO1.

Furthermore, said first opto-electronic receiver B-PD1 comprises two photodiodes, configured to perform a balanced detection, wherein the first electrical signal E1 is obtained as a subtraction of the outgoing currents from the two photodiodes of the first opto-electronic receiver B-PD1.

Similarly, the aforesaid second optical coupler OC2 is a 2×2 optical coupler, configured to output two optical beat signals, resulting from the combination of the second reflected optical spectrum component OR2 and the second local oscillator optical signal LO2.

Furthermore, said second opto-electronic receiver B-PD2 comprises two photodiodes, configured to perform a balanced detection, in which the second electrical signal E2 is obtained as a subtraction of the outgoing currents from the two photodiodes of the second opto-electronic receiver B-PD2.

Figure 8:
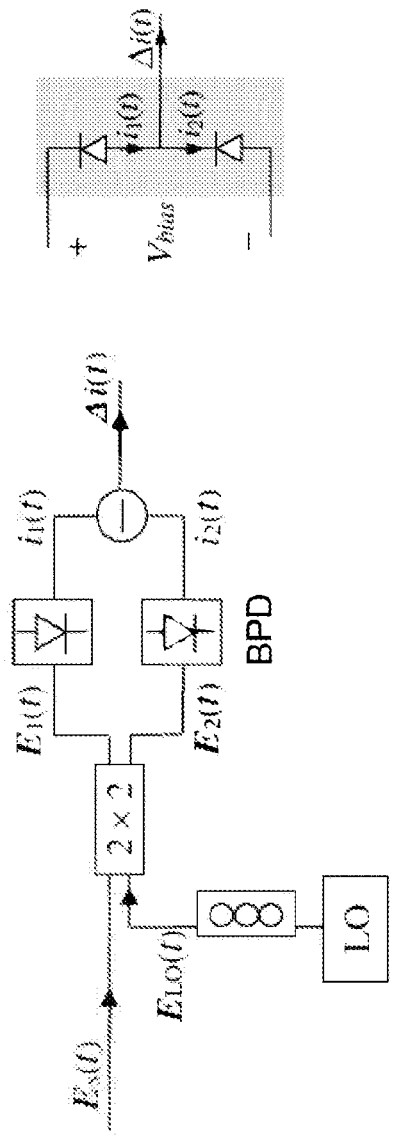
FIG. 8 illustrates, in a simplified manner, some known optical heterodyne detection/reception techniques.

According to an implementation option, the balanced heterodyne detection is performed using balanced detection techniques known in themselves, such as the one shown in FIG. 8.

In this case, the 1×2 optical couplers are replaced by 2×2 optical couplers and the two output ports of the optical couplers are connected to a BPD balanced photodetector.

Performing a balanced coherent heterodyne detection improves the signal-to-noise ratio SNR of the detected signal and avoids unwanted effects of local oscillator intensity noise.

Specifically, the balanced coherent heterodyne detection shown in FIG. 2 employs a 2×2 optical coupler and two photodiodes in parallel. The difference between the two photocurrents provides only one component, namely the intermediate frequency component, which can be expressed as:

$$i(t)_1 - i(t)_2 \approx \mathcal{R}\sqrt{P_sP_{LO}}\cos\theta\cos(\omega_{IF}t+\Delta\varphi)$$

In this configuration, advantageously, the DC components of the optical signal and the local oscillator signal are canceled, and such a scheme makes it possible to increase the signal-to-noise ratio SNR and reduce the undesirable effects of excess laser noise (intensity noise, etc.) and non-local effects in the reflected response.

Figure 4:
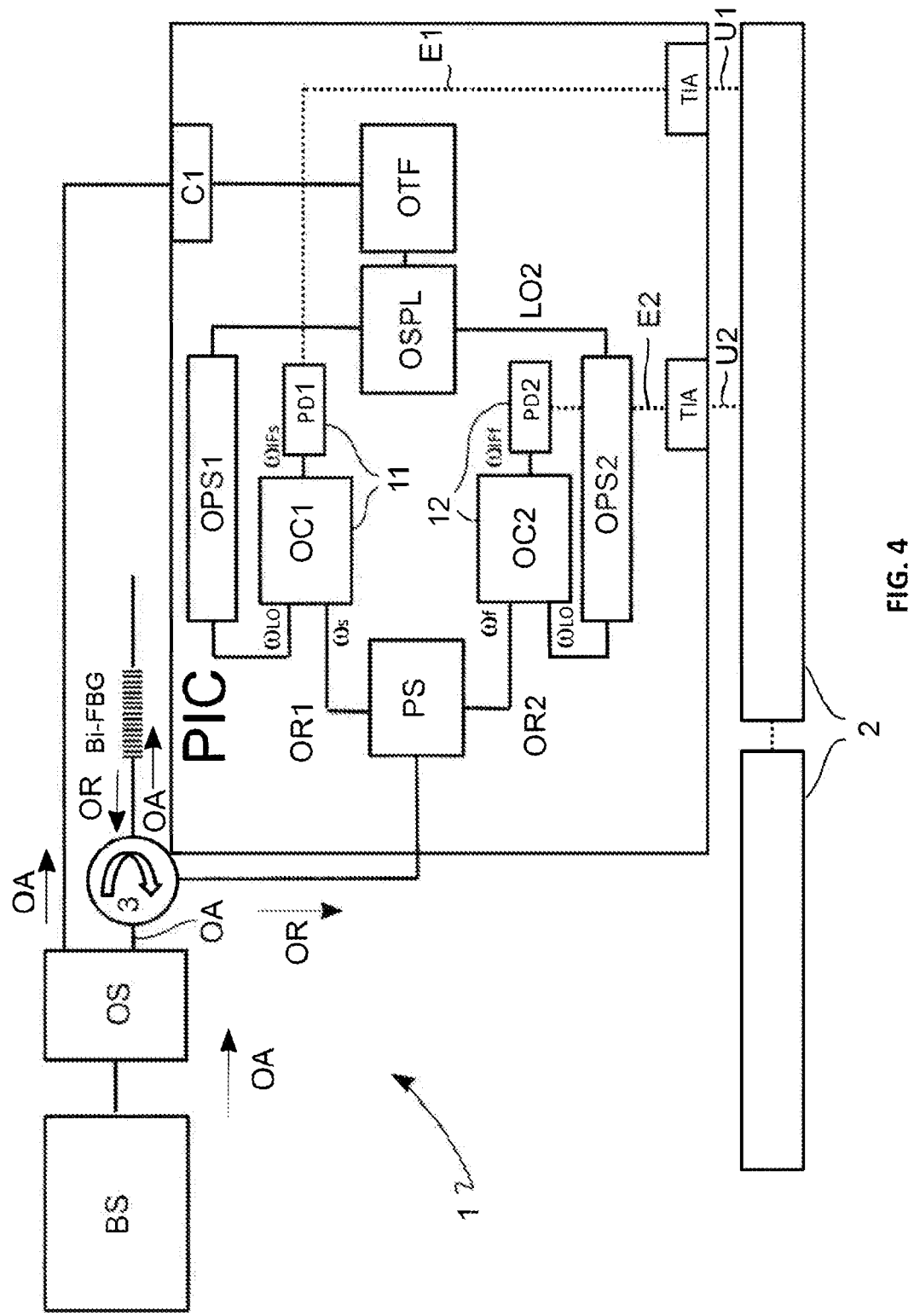
FIG. 4 illustrates a different embodiment of a system for interrogating a sensor of the birefringent Fiber Bragg Grating (Bi-FBG) type by means of a functional block chart.

According to an embodiment of the system, shown in FIG. 4, the first heterodyne detection means further comprise a first optical phase shifter OPS1, configured to shift, in a controlled manner, the phase of the first local oscillator optical signal LO1, before the input in the first optical coupler OC1. The second heterodyne detection means further comprise a second optical phase shifter OPS2, configured to shift a controlled manner, the phase of the second local oscillator optical signal LO2, before the input in the second optical coupler OC2.

Thus, in this case, the PIC device integrates two optical phase shifters which can control and modulate the phase of the local optical oscillator signal.

The phase shifters add a phase control of the local oscillator; the phase of the local oscillator can be modulated by the phase shifter, which advantageously makes it possible to increase the sensitivity of the measurement by a phase control.

Figure 5:
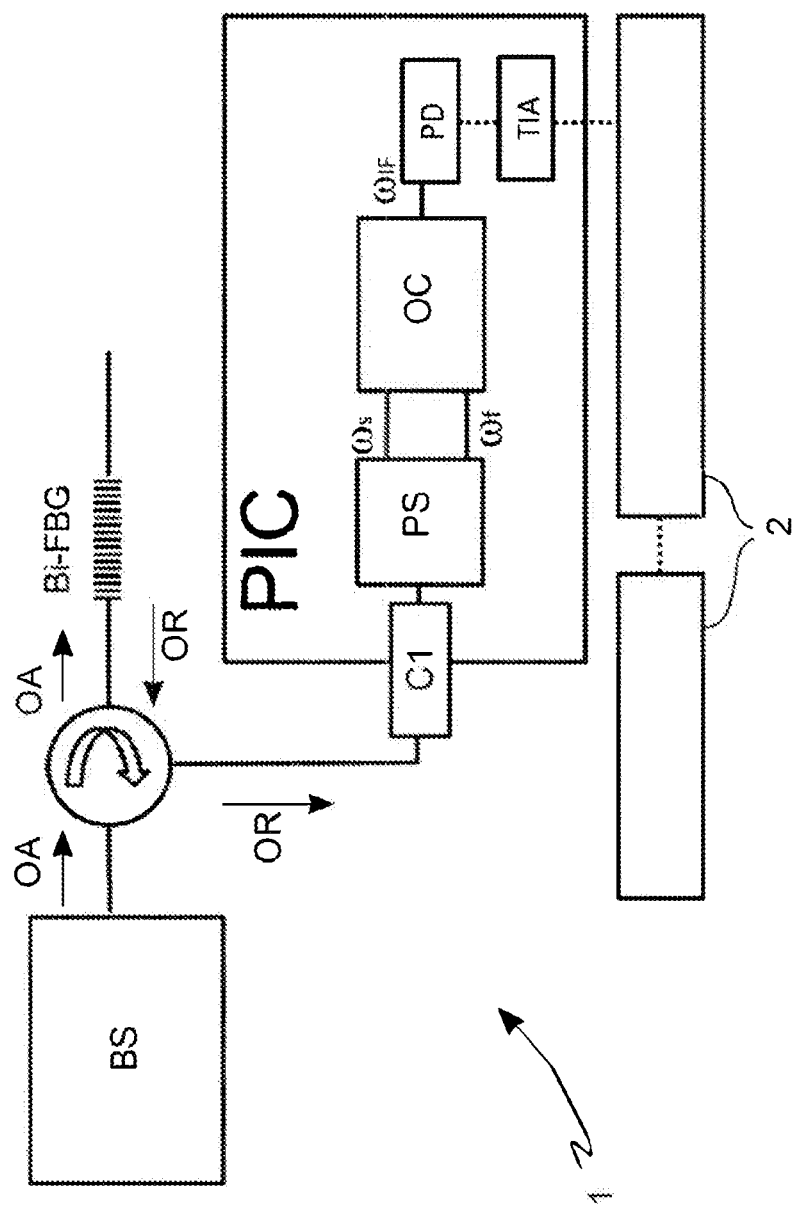
FIG. 5 illustrates a different embodiment of a system for interrogating a sensor of the birefringent Fiber Bragg Grating (Bi-FBG) type by means of a functional block chart.

According to another embodiment of the system, shown in FIG. 5, the optical signals at the two frequencies ωs and ωf are coupled together in a directional coupler. Again, the intermediate frequency of heterodyne detection is given by $\omega_{IFs}=\omega s-\omega f$.

According to an embodiment (shown in FIG. 6) the system is configured for interrogating a plurality of sensors of the birefringent Fiber Bragg Grating type (Bi-FBG1-Bi-FBGn) in cascade, each characterized by a respective nominal operating wavelength (λ1-λn).

In such an embodiment, the PS-polarized optical beam splitter is configured to separate a first component and a second component of the overall ORT reflected optical spectrum from the birefringent Fiber Bragg Grating (Bi-FBG1-Bi-FBGn) sensor cascade.

The first component of the overall reflected optical spectrum ORT1 comprises the superposition of the first components (OR11-OR1n) with the first optical polarization centered around a respective first frequency (ω11-ω1n), and the second component of the overall reflected optical spectrum ORT2 comprises the superposition of the second components (OR21-OR2n) with second optical polarization centered around a respective second frequency (ω21-ω2n).

In this case, the system further comprises first and second frequency discrimination or demultiplexing means, and a plurality of first heterodyne detection means, and a plurality of second heterodyne detection means.

The first frequency discrimination or demultiplexing means AWG1 are configured to spectrally separate the first components (OR11-OR1n) from one another.

The second frequency discrimination or demultiplexing means AWG2 are configured to spectrally separate the second components (OR21-OR2n) from one another.

The first heterodyne detection means are configured to operate on respective first components (OR11-OR1n) to obtain a respective plurality of first electrical signals E1n.

The second heterodyne detection means, configured to operate on respective second components (OR21-OR2n) to obtain a respective plurality of second electrical signals E2n.

According to an implementation option (referred to in the example shown in FIG. 6), both the first and second means of frequency discrimination or demultiplexing are made by means of respective integrated "array waveguide gratings" (AWG) type devices, placed at the output of the polarization splitter, which enable measurements based on WDM—Wavelength Division Multiplexing.

The AWG device is an optical device for distributing an optical signal comprising a plurality of N wavelengths, present at a single waveguide input, and making it available at the input of N different output waveguides.

The wavelength peaks reflected from the N birefringent Bi-FBG sensors are coupled to the PIC device; the N wavelengths each corresponding to the fast axis and slow axis polarized optical signals are separated and sent to two different waveguides, and each individual wavelength is filtered and selected to a respective different output port of the AWG device. Each individual wavelength at a respective output port of the AWG device can be detected by any of the previously illustrated schemes with reference to querying a single birefringent Bi-FBG sensor.

According to another option of implementation, the first and/or second means of frequency discrimination or demultiplexing are made by other types of respective WDM demultiplexing devices, known in themselves.

According to an implementation option, already mentioned above, the aforementioned tunable narrowband optical bandpass filter OTF is a micro-ring optical resonator filter, known in itself.

For example, the ring resonator is a structure in which the fiber or optical waveguide is enclosed in a "loop" configuration; when light, at a particular resonant wavelength, passes through the ring (or loop) in constructive interference conditions, the intensity of the light increases in the structure, and light can be extracted/observed at the monitor port of the extraction port at the given resonant wavelength.

The micro-ring resonator can be designed and integrated into the integrated photonic circuit PIC and can be used as a bandpass filter, or optical switch, or optical intensity modulator.

The resonant wavelength of the micro-ring resonator depends on the refractive index and geometry of the device (e.g., the size of the optical waveguide and the ring diameter), and the resonant wavelength can be tuned by a small change in the refractive index of the optical waveguide, e.g., by thermal tuning based on a local micro-heater.

According to an implementation option of the system, the aforesaid polarization optical beam splitter PS is a polarization optical beam splitter made by means of integrated photonics technique of two-dimensional grating coupler type.

According to another implementation option of the system, the aforesaid polarization optical beam splitter PS is a polarization optical beam splitter made by means of the integrated photonics technique of polarization splitter and rotator—PSR type.

With reference to the polarization optical beam splitter, it is worth noting that there are different strategies to couple and propagate orthogonal polarizations of the same light beam in the silicon optical waveguide. The most popular known solutions are the two-dimensional grating coupler and the edge coupler combined with a polarization splitter and rotator (PSR).

The two-dimensional grating coupler (2D GC) can be considered as the superposition of two one-dimensional grating couplers (1D GC), in which the two orthogonal polarizations coming from the fiber, at the input, are coupled to two polarized optical waveguides TE in the orthogonal direction. The two orthogonal polarizations are coupled to the optical waveguide in which the light propagates with the same polarization.

In a PSR polarization rotator and splitter, the signal comprising two orthogonal polarizations is sent to an integrated polarization optical beam splitter, which divides the light into two separate signals with the two orthogonal polarizations TE and TM [see for example; M. R. Watts, H. A. Haus, E. P. Ippen "Integrated mode-evolution-based polarization splitter" Opt. Lett. 30, 967-969 (2005)]; the separated, TM-polarized signal is sent to a polarization beam rotator, where the polarization is rotated 90° into a TE-polarized signal [M. R. Watts, H. A. Haus, "Integrated mode-evolution-based polarization rotators," Opt. Lett. 30, 138-140 (2005)].

According to an implementation option of the system, each of the aforesaid first opto-electronic receiver PD1 and/or said second opto-electronic receiver PD2 comprises at least a respective semiconductor photodiode configured to detect and convert optical signals, at the wavelengths considered, into electrical signals.

According to an embodiment, the system further comprises an optical circulator 3 having a first circulator port connected to the broadband optical radiation source BS, a second circulator port connected to a birefringent optical fiber containing the sensor of the birefringent Fiber Bragg Grating Bi-FBG type, and a third circulator port connected to an optical input port of the photonic integrated device PIC.

Such an optical circulator 3 is configured to transmit the broadband optical radiation OA, received from the first circulator port, to the birefringent optical fiber containing the sensor of the Fiber Bragg Grating Bi-FBG type, through the second circulator port, and it is further configured to convey the spectrum reflected by the sensor of the birefringent Fiber Bragg Grating Bi-FBG type, received from the second circulator port to the optical input port of the photonic integrated device PIC, through the third circulator port.

According to an embodiment of the system, the aforesaid first reference wavelength $\lambda_{ref1}$ and said second reference wavelength $\lambda_{ref2}$ correspond to two respective nominal operating wavelengths of the sensor of the birefringent Fiber Bragg Grating Bi-FBG type, on the two fast and slow channels, determined by means of an initial calibration According to another embodiment of the system, the aforesaid first reference wavelength $\lambda_{ref1}$ and said second reference wavelength $\lambda_{ref2}$ coincide and correspond to a reference wavelength $\lambda i$ identified by the tuning of the narrowband band-pass optical tunable filter OTF.

According to an implementation option of the system, the aforesaid first reference wavelength $\lambda_{ref1}$ and second reference wavelength $\lambda_{ref2}$ correspond, respectively, to two reference wavelengths $\lambda i1$ and $\lambda i2$ identified by the tuning of the two narrowband band-pass optical tunable filters (OTF1, OTF2).

According to another implementation option of the method, the aforesaid first reference wavelength $\lambda_{ref1}$ and the aforesaid said second reference wavelength $\lambda_{ref2}$ coincide and correspond to two respective nominal operating wavelengths of the sensor of the birefringent Fiber Bragg Grating Bi-FBG type, on the two fast and slow channels.

A method for determining at least two physical magnitudes detectable by a sensor of the birefringent Fiber Bragg Grating Bi-FBG type is now described.

Such a system comprises a sensor of the birefringent Fiber Bragg Grating Bi-FBG type, a system for interrogating at least one birefringent Fiber Bragg Grating Bi-FBG type according to any one of the embodiments described above, wherein the electronic processing means are further configured to determine the at least two physical magnitudes on the basis of a processing of said first intermediate frequency to $\omega_{IF1}$ and second intermediate frequency $\omega_{IF2}$ detected.

According to an implementation option, the two determined physical magnitudes are a longitudinal strain and a transverse strain.

According to another implementation option, the two determined physical magnitudes are a strain and a temperature.

According to an embodiment of such a system, the birefringent Fiber Bragg Grating Bi-FBG type sensor is configured to operate in a brake pad or embedded in or attached to a brake caliper, or embedded in a washer device adapted to be placed between a brake caliper bracket and a brake caliper.

The at least two physical magnitudes detected are a longitudinal strain and a transverse strain, which are present at the point where the birefringent Fiber Bragg Grating (Bi-FBG) sensor is located and which, as a whole, represent a clamping force and/or braking torque acting on the brake caliper.

It is worth noting that the object of the present invention is fully achieved by the method and system illustrated above by virtue of the functional and structural features thereof.

Indeed, with reference to the technical problems stated in the description part of the prior art, the system according to the invention is a simple and compact system, in which the essential components are integrated (e.g., in photonic integrated circuits in PIC technology).

The system and method for interrogating Bi-FBG sensors made of birefringent fiber, according to the invention, meets the criteria of (i) compactness and simplicity in structure and in use, (ii) effectiveness in performance.

This is because such a method and system are based on photonic integrated circuits, which is made possible in that the solution of the present invention includes optical division based on polarization of the spectrum reflected by the birefringent Bi-FBG sensor, and subsequent double heterodyne coherent detection (functions that can be accomplished by components that can be integrated into a PIC).

Furthermore, the need for local oscillators (which would not be integrable into the PIC) is avoided, because signals substantially similar to those generated by local oscillators are obtained in the PIC circuit through narrowband optical filtering of a replica of the same broadband optical querying radiation.

Based on the foregoing, the interrogating system provided by the present invention is sufficiently small and simple, while remaining effective, to be installed in technical contexts, such as strain and temperature sensing in brake calipers, and very suitable for brake pads.

In such contexts, the advantages, already mentioned above, offered by the birefringent Bi-FBG sensor are particularly apparent, including in particular the ability to simultaneously detect at least two magnitudes or physical parameters (e.g., transverse strain and longitudinal strain, or strain and temperature).

To meet contingent and specific needs, the person skilled in the art may make several changes and adaptations to the above-described embodiments and may replace elements with others which are functionally equivalent, without however departing from the scope of the following claims. All the features described above as belonging to one possible embodiment may be implemented independently from the other described embodiments.

The invention claimed is:

1. A method for interrogating at least one sensor of the birefringent Fiber Bragg Grating type (Bi-FBG), comprising the steps of:
    illuminating said at least one sensor of the birefringent Fiber Bragg Grating type (Bi-FBG) with a broadband optical excitation radiation (OA);
    conveying the reflected optical spectrum (OR), reflected by the at least one sensor of the birefringent Fiber Bragg Grating type (Bi-FBG), into a detection photonic integrated circuit (PIC);
    separating a first component of said reflected optical spectrum (OR1), characterized by a first optical polarization generated by the birefringence and centered around a first frequency ($\omega 1$), from a second component of said reflected optical spectrum (OR2) characterized by a second optical polarization generated by the birefringence and centered around a second frequency ($\omega 2$), by means of a polarization optical beam splitter (PS) comprised in the detection photonic integrated circuit (PIC);
    providing said broadband optical excitation radiation (OA) to the detection photonic integrated circuit (PIC);
    obtaining at least two narrowband optical signals (LO1, LO2), on the basis of at least one narrowband optical filtering of said broadband optical excitation radiation (OA) carried out in the detection photonic integrated circuit (PIC), wherein said at least two narrowband optical signals (LO1, LO2) comprise a first local oscillator optical signal (LO1), centered around a first local oscillator frequency ($\omega LO1$), and a second local oscillator optical signal (LO2), centered around a second local oscillator frequency ($\omega LO2$);
    providing said first component of the reflected optical spectrum (OR1) and said first local oscillator optical signal (LO1) to first optical heterodyne detection means, integrated into said detection photonic integrated circuit (PIC), to carry out a heterodyne detection and obtain a first electrical signal (E1) at a first intermediate frequency ($\omega IFs$), equal to the difference between the first local oscillator frequency ($\omega LO1$) and said first frequency ($\omega 1$) of the first component of the reflected optical spectrum (OR1);
    providing said second component of the reflected optical spectrum (OR2) and said second local oscillator optical signal (LO2) to second optical heterodyne detection means, integrated into said detection photonic integrated circuit (PIC), to carry out a heterodyne detection and obtain a second electrical signal (E2) at a second intermediate frequency ($\omega IFf$), equal to the difference between the second local oscillator frequency ($\omega LO2$) and said second frequency ($\omega 2$) of the second component of the reflected optical spectrum (OR2);
    determining said first intermediate frequency ($\omega IF1$), indicative of a first wavelength shift ($\Delta\lambda 1$) of the first component of the reflected optical spectrum (OR1), having the first polarization, with respect to a first reference wavelength ($\lambda ref1$; $\lambda i$);
    determining said second intermediate frequency ($\omega IF2$), indicative of a second wavelength shift ($\Delta\lambda 2$) of the second component of the reflected optical spectrum (OR2), having the second polarization, with respect to a second reference wavelength ($\lambda ref2$) of the Bragg grating of the sensor of the birefringent Fiber Bragg Grating type (Bi-FBG);
    wherein said first wavelength shift ($\Delta\lambda 1$) and said second wavelength shift ($\Delta\lambda 2$) are representative of at least one physical magnitude measured by the sensor of the birefringent Fiber Bragg Grating type (Bi-FBG).

2. A method according to claim 1, wherein said step of obtaining at least two narrowband optical signals (LO1, LO2) comprises:
    narrowband filtering said broadband optical excitation radiation (OA), by means of a narrowband band-pass optical tunable filter (OTF) integrated into the detection photonic integrated circuit (PIC), to obtain a narrowband optical signal centered around a local oscillator frequency ($\omega LO$) adapted to act as a local oscillator signal (LO);
    splitting said narrowband optical signal by means of an optical beam splitter (OSPL), configured to make two attenuated replicas of the same narrowband optical signal, received as input, available to two output ports, wherein the first local oscillator signal (LO1) and the second local oscillator signal (LO2) are the two signals, identical to each other, present at the two output ports of the optical beam splitter.

3. A method according to claim 2, wherein said first reference wavelength (λref1) and said second reference wavelength (λref2) coincide and correspond to a reference wavelength (λi) identified by the tuning of the narrowband band-pass optical tunable filter (OTF), or wherein said first reference wavelength (λref1) and said second reference wavelength (λref2) correspond, respectively, to two reference wavelengths (λi1, λi2) identified by the tuning, respectively, of the two narrowband band-pass optical tunable filters (OTF1, OTF2).

4. A method according to claim 1, wherein said step of obtaining at least two narrowband optical signals (LO1, LO2) comprises:
  splitting said broadband optical excitation radiation (OA) by means of an optical beam splitter (OSPL), to obtain a first replica of the broadband optical excitation radiation and a second replica of the broadband optical excitation radiation;
  narrowband filtering said first replica of the broadband optical excitation radiation, by means of a first narrowband band-pass optical tunable filter (OTF1) integrated into the detection photonic integrated circuit (PIC), to obtain the first narrowband optical signal centered around the first local oscillator frequency (ωLO1);
  narrowband filtering said second replica of the broadband optical excitation radiation, by means of a second narrowband band-pass optical tunable filter (OTF2) integrated into the detection photonic integrated circuit (PIC), to obtain the second narrowband optical signal centered around the second local oscillator frequency (ωLO2).

5. A method according to claim 1, wherein the step of carrying out a heterodyne detection and obtaining a first electrical signal (E1) comprises combining the first component of the reflected optical spectrum (OR1) and the first local oscillator optical signal (LO1) in an optical waveguide of a first optical coupler (OC1) of the first optical heterodyne detection means and further comprises converting the optical signal obtained at the output of the first optical coupler into a respective first electrical signal (E1), by means of a first opto-electronic receiver (PD1) of the first optical heterodyne detection means;
  and wherein the step of carrying out a heterodyne detection and obtaining a second electrical signal (E2) comprises combining the second component of the reflected optical spectrum (OR2) and the second local oscillator optical signal (LO2) in an optical waveguide of a second optical coupler (OC2) of the second optical heterodyne detection means, and further comprises converting the optical signal obtained at the output of the second optical coupler into a respective second electrical signal (E2), by means of a second opto-electronic receiver (PD2) of the second optical heterodyne detection means.

6. A method according to claim 5, wherein each of the steps of carrying out a heterodyne detection to obtain a first electrical signal (E1) and a second electrical signal (E2) comprises carrying out a balanced detection, using a respective 2×2 optical coupler, configured to provide as output two optical signals, for each heterodyne detection, which are detected by two respective photodiodes for balanced detection, for each heterodyne detection, wherein each of the first electrical signal (E1) and the second electrical signal (E2) is obtained as a subtraction of the currents output from the respective photodiodes,
  or wherein carrying out the first heterodyne detection further comprises shifting, in a controlled manner, the phase of the first local oscillator optical signal (LO1) by means of a first optical phase shifter (OPS1), comprised in the photonic integrated circuit (PIC), before the input in the first optical coupler (OC1),
  and wherein carrying out the second heterodyne detection further comprises shifting, in a controlled manner, the phase of the second local oscillator optical signal (LO2) by means of a second optical phase shifter (OPS2), comprised in the photonic integrated circuit (PIC), before the input in the second optical coupler (OC2).

7. A method according to claim 1, wherein the step of carrying out a heterodyne detection comprises injecting the first component of the reflected optical spectrum (OR1) and the second component of the reflected optical spectrum (OR2) into a single 2×1 optical coupler (OC), configured to generate as output an optical signal at an intermediate frequency (ωIF) representative of the difference between the frequency deviations of the first component of the reflected optical spectrum (OR1) and the second component of the reflected optical spectrum (OR2).

8. A method according to claim 1 configured to interrogate a plurality of sensors of the birefringent Fiber Bragg Grating type (Bi-FBG1-Bi-FBGn) in cascade, each characterized by a respective nominal operating wavelength (λ1-λn), wherein
  the step of conveying comprises conveying the overall reflected optical spectrum (ORT), reflected by the cascade of sensors of the birefringent Fiber Bragg Grating type (Bi-FBG1-Bi-FBGn), into a detection photonic integrated circuit (PIC);
  the step of separating comprises separating a first component of said overall reflected optical spectrum (ORT1) and a second component of said overall reflected optical spectrum (ORT2),
  wherein the first component of the overall reflected optical spectrum (ORT1) comprises the superposition of the first components (OR11-OR1n) with first optical polarization, each centered around a respective first frequency (ω11-ω1n),
  and the second component of the overall reflected optical spectrum (ORT2) comprises the superposition of the second components (OR21-OR2n) with second optical polarization, each centered around a respective second frequency (ω21-ω2n);
  wherein the method comprises the further steps of:
  spectrally separating the first components (OR11-OR1n) from one another by means of first frequency discrimination or demultiplexing means (AWG1);
  spectrally separating the second components (OR21-OR2n) from one another by means of second frequency discrimination or demultiplexing means (AWG2);
  carrying out said heterodyne detection steps on each of the first components (OR11-OR1n) and each of the second components (OR21-OR2n), to obtain a respective plurality of first electrical signals (E1k) and second electrical signals (E2k);
  carrying out said steps of determining the first intermediate frequency (ωIFs,k) and the second intermediate frequency (ωIFf,k) for each pair of first electrical signal (E1k) and second electrical signal (E2k) corresponding to a respective sensor of the birefringent Fiber Bragg Grating type (Bi-FBGk).

9. A method according to claim 1, wherein said first optical polarization corresponds to the polarization on a "slow polarization axis" and the first birefringence peak frequency ($\omega 1$) corresponds to the slow axis birefringence peak frequency ($\omega s$), and wherein said second optical polarization is orthogonal to the first optical polarization and corresponds to the polarization on a "fast polarization axis", orthogonal to said "slow axis", and the second birefringence peak frequency ($\omega 2$) corresponds to the fast axis birefringence peak frequency ($\omega f$).

10. A method according to claim 1, wherein said first reference wavelength ($\lambda ref1$) and said second reference wavelength ($\lambda ref2$) correspond to two respective nominal operating wavelengths of the sensor of the birefringent Fiber Bragg Grating type (Bi-FBG), on the two fast and slow channels, determined by means of an initial calibration.

11. A method for determining at least two physical magnitudes detectable by a sensor of the birefringent Fiber Bragg Grating type (Bi-FBG) comprising:
  carrying out a method for interrogating at least one sensor of the birefringent Fiber Bragg Grating type (Bi-FBG), according to claim 1;
  determining the at least two physical magnitudes based on a processing of said first intermediate frequency ($\omega IFs$) and second intermediate frequency ($\omega IFf$).

12. A method according to claim 11, wherein the two physical magnitudes determined are longitudinal strain and a transverse strain,
  or wherein the two physical magnitudes determined are a strain and a temperature.

13. A system (1) for interrogating at least one sensor of the birefringent Fiber Bragg Grating type (Bi-FBG), comprising:
  a broadband optical radiation source (BS), configured to illuminate said at least one sensor of the birefringent Fiber Bragg Grating type (Bi-FBG) with a broadband optical excitation radiation (OA);
  a detection photonic integrated device (PIC) having a first input port (C1), operatively connectable to said at least one sensor of the birefringent Fiber Bragg Grating type (Bi-FBG) to receive the reflected optical spectrum (OR) from said sensor, and a second input port (C2), operatively connected with said broadband optical radiation source (BS) to receive said broadband optical excitation radiation (OA);
  wherein said detection photonic integrated device (PIC) comprises:
  a polarization optical beam splitter (PS), configured to separate a first component of said reflected optical spectrum (OR1), characterized by a first optical polarization generated by the birefringence and centered around a first frequency ($\omega 1$), from a second component of said reflected optical spectrum (OR2) characterized by a second optical polarization generated by the birefringence and centered around a second frequency ($\omega 2$);
  means for generating local oscillator signals, configured to obtain at least two narrowband optical signals (LO1, LO2), comprising a first local oscillator optical signal (LO1), centered around a first local oscillator frequency ($\omega LO$; $\omega LO1$), and a second local oscillator optical signal (LO2), centered around a second local oscillator frequency ($\omega LO$; $\omega LO2$),
  wherein said means for generating local oscillator signals comprise at least one narrowband band-pass optical tunable filter (OTF), configured to perform a narrowband optical filtering of said broadband optical excitation radiation (OA);
  first optical heterodyne detection means (11) configured to receive said first component of the reflected optical spectrum (OR1) and said first local oscillator optical signal (LO1) and generate, by means of heterodyne detection techniques, on the basis of the first component of the reflected optical spectrum (OR1) and of the first local oscillator optical signal (LO1), a first electrical signal (E1) at a first intermediate frequency ($\omega IFs$), equal to the difference between the first local oscillator frequency ($\omega LO1$) and said first frequency ($\omega 1$) of the first component of the reflected optical spectrum (OR1);
  second optical heterodyne detection means (12) configured to receive said second component of the reflected optical spectrum (OR2) and said second local oscillator optical signal (LO2) and generate, by means of heterodyne detection techniques, on the basis of the second component of the reflected optical spectrum (OR2) and of the second local oscillator optical signal (LO2), a second electrical signal (E2) at a second intermediate frequency ($\omega IFf$), equal to the difference between the second local oscillator frequency ($\omega LO2$) and said second frequency ($\omega 2$) of the second component of the reflected optical spectrum (OR2);
  a first output port (U1), configured to make said first electrical signal (E1) available, and a second output port (U2), configured to make said second electrical signal (E2) available;
  and wherein the system further comprises:
  electronic processing means (2), operatively connected to said photonic integrated device (PIC) to receive said first electrical signal (E1) and second electrical signal (E2), and configured to determine said first intermediate frequency ($\omega IFs$), indicative of a first wavelength shift ($\Delta\lambda 1$) of the first component of the reflected optical spectrum (OR1), having the first polarization, with respect to a first reference wavelength ($\lambda ref1$; $\lambda i$) of the Bragg grating of the sensor of the birefringent Fiber Bragg Grating type (Bi-FBG), and also configured to determine said second intermediate frequency ($\omega IFf$), indicative of a second wavelength shift ($\Delta\lambda 2$) of the second component of the reflected optical spectrum (OR2), having the second polarization, with respect to a second reference wavelength ($\lambda ref2$) of the Bragg grating of the sensor of the birefringent Fiber Bragg Grating type (Bi-FBG),
  wherein said first wavelength shift ($\Delta\lambda 1$) and said second wavelength shift ($\Delta\lambda 2$) are representative of at least one physical magnitude measured by the sensor of the birefringent Fiber Bragg Grating type (Bi-FBG).

14. A system (1) according to claim 13, wherein said means for generating local oscillator signals comprise:
  a narrowband band-pass optical tunable filter (OTF), configured to narrowband filter said broadband optical excitation radiation (OA), and to generate a narrowband optical signal centered around a local oscillator frequency ($\omega LO$) adapted to act as a local oscillator signal (LO);
  an optical beam splitter (OSPL) configured to split said narrowband optical signal (LO) and to make two attenuated replicas of the same narrowband optical signal available to two output ports of the optical beam splitter, said attenuated replicas being attenuated replicas of the same narrowband optical signal received as input, corresponding, respectively, to the first local oscillator signal (LO1) and the second local oscillator signal (LO2), or wherein said means for generating local oscillator signals comprise:

an optical beam splitter (OSPL) configured to split said broadband optical excitation radiation (OA), to obtain a first replica of the broadband optical excitation radiation and a second replica of the broadband optical excitation radiation;

a first narrowband band-pass optical tunable filter (OTF1), configured to narrowband filter said first replica of the broadband optical excitation radiation, and to generate the first narrowband optical signal (LO1) centered around the first local oscillator frequency ($\omega$LO1);

a second narrowband band-pass optical tunable filter (OTF2), configured to narrowband filter said second replica of the broadband optical excitation radiation, and to generate the second narrowband optical signal (LO2) centered around the second local oscillator frequency ($\omega$LO2).

15. A system (1) according to claim 13, wherein:

the first heterodyne detection means comprise:

a first optical coupler (OC1) comprising a respective optical waveguide, configured to combine the first component of the reflected optical spectrum (OR1) and the first local oscillator optical signal (LO1);

a first opto-electronic receiver (PD1) configured to receive the output optical signal from the first optical coupler (OC1) and convert it into a respective first electrical signal (E1);

the second heterodyne detection means comprise:

a second optical coupler (OC2) comprising a respective optical waveguide, configured to combine the second component of the reflected optical spectrum (OR2) and the second local oscillator optical signal (LO2);

a second opto-electronic receiver (PD2) configured to receive the output optical signal from the second optical coupler (OC2) and convert it into a respective second electrical signal (E2), and wherein:

said first optical coupler (OC1) is a 2×2 optical coupler, configured to provide as output two optical beat signals, deriving from the combination of the first component of the reflected optical spectrum (OR1) and the first local oscillator optical signal (LO1), and wherein said first opto-electronic receiver (B-PD1) comprises two photodiodes, configured to perform a balanced detection, wherein the first electrical signal (E1) is obtained as a subtraction of the currents output from the two photodiodes of the first opto-electronic receiver (PD1);

said second optical coupler (OC2) is a 2×2 optical coupler, configured to provide as output two optical beat signals, deriving from the combination of the second component of the reflected optical spectrum (OR2) and the second local oscillator optical signal (LO2), and wherein said second opto-electronic receiver (B-PD2) comprises two photodiodes, configured to perform a balanced detection, wherein the second electrical signal (E2) is obtained as a subtraction of the currents output from the two photodiodes of the second opto-electronic receiver (PD2);

or wherein the first heterodyne detection means further comprise a first optical phase shifter (OPS1), configured to shift, in a controlled manner, the phase of the first local oscillator optical signal (LO1), before the input in the first optical coupler (OC1), wherein the second heterodyne detection means further comprise a second optical phase shifter (OPS2), configured to shift, in a controlled manner, the phase of the second local oscillator optical signal (LO2), before the input in the second optical coupler (OC2).

16. A system (1) according to claim 13, configured to query a plurality of sensors of the birefringent Fiber Bragg Grating type (Bi-FBG1-Bi-FBGn) in cascade, each characterized by a respective nominal operating wavelength ($\lambda$1-$\lambda$n), wherein:

the polarization optical beam splitter (PS) is configured to separate a first component (ORT1) and a second component (ORT2) of the overall reflected optical spectrum (ORT) from the cascade of sensors of the birefringent Fiber Bragg Grating type (Bi-FBG1-Bi-FBGn), wherein the first component of the overall reflected optical spectrum (ORT1) comprises the superposition of the first components (OR11-OR1$n$) with first optical polarization, centered around a respective first frequency ($\omega$11-$\omega$1$n$), and the second component of the overall reflected optical spectrum (ORT2) comprises the superposition of the second components (OR21-OR2$n$) with second optical polarization centered around a respective second frequency ($\omega$21-$\omega$2$n$);

and wherein the system further comprises:

first frequency discrimination or demultiplexing means (AWG1) configured to spectrally separate said first components (OR11-OR1$n$) from one another;

second frequency discrimination or demultiplexing means (AWG2) configured to spectrally separate said second components (OR21-OR2$n$) from one another;

a plurality of first heterodyne detection means, configured to operate on respective first components (OR11-OR1$n$) to obtain a respective plurality of first electrical signals (En);

a plurality of second heterodyne detection means, configured to operate on respective second components (OR21-OR2$n$) to obtain a respective plurality of second electrical signals (E2$n$).

17. A system (1) according to claim 13, wherein said narrowband band-pass optical tunable filter (OTF) is an optical micro-ring resonator filter, and/or wherein said polarization optical beam splitter (PS) is a polarization optical beam splitter made by means of an integrated photonics technique of the "two-dimensional grating coupler" type, or by means of an integrated photonics technique of the "polarization splitter and rotator-PSR" type, and/or wherein each of said first opto-electronic receiver (PD1) and/or said second opto-electronic receiver (PD2) comprises at least a respective semiconductor photodiode configured to detect and convert optical signals, at the wavelengths considered, into electrical signals.

18. A system (1) according to claim 13, further comprising an optical circulator (3) having a first circulator port connected to the broadband optical radiation source (BS), a second circulator port connected to a birefringent optical fiber containing the sensor of the Fiber Bragg Grating type (Bi-FBG), and a third circulator port connected to an optical input port of the photonic integrated device (PIC), wherein the optical circulator (3) is configured to transmit the broadband optical radiation (OA), received from the first circulator port, to the birefringent optical fiber containing the sensor of the Fiber Bragg Grating type (Bi-FBG), through the second circulator port, and it is further configured to convey the spectrum reflected by the sensor of the Fiber Bragg Grating type (Bi-FBG), received from the second circulator port to the optical input port of the photonic integrated device (PIC), through the third circulator port.

19. A system for determining at least two physical magnitudes detectable by a sensor of the birefringent Fiber Bragg Grating type (Bi-FBG) comprising:

a sensor of the birefringent Fiber Bragg Grating type (Bi-FBG);

a system (1) for interrogating at least one sensor of the birefringent Fiber Bragg Grating type (Bi-FBG) according to claim 13, wherein the electronic processing means (2) are further configured to determine the at least two physical magnitudes based on a processing of said first intermediate frequency ($\omega$IFs) and second intermediate frequency ($\omega$IFf) detected.

20. A system according to claim 19, wherein the sensor of the birefringent Fiber Bragg Grating type (Bi-FBG) is configured to operate within a brake pad or incorporated in or coupled with a brake caliper, or incorporated in a washer device adapted to be arranged between a brake caliper support and a brake caliper, and wherein the at least two physical magnitudes detected are a longitudinal strain and a transverse strain, present in the point where the sensor of the birefringent Fiber Bragg Grating type (Bi-FBG) is placed and generally representative of a tightening force and/or braking torque acting on the brake caliper.

* * * * *